United States Patent [19]

Morse et al.

[11] Patent Number: 4,988,054
[45] Date of Patent: Jan. 29, 1991

[54] LIGHT-TIGHT CASSETTE

[75] Inventors: Mark J. Morse; Andrew E. Dominesey, both of Rochester, N.Y.

[73] Assignee: Eastman Kodak Company, Rochester, N.Y.

[21] Appl. No.: 358,986

[22] Filed: May 26, 1989

[51] Int. Cl.$^5$ .................................... G03B 17/26
[52] U.S. Cl. ........................... 242/71.700; 242/71; 242/55.53; 206/389; 206/407; 206/409
[58] Field of Search .................. 242/71, 71.1, 71.7, 242/55.53; 206/389, 395, 397, 407, 408, 409; 354/275

[56] References Cited

U.S. PATENT DOCUMENTS

| | | | |
|---|---|---|---|
| 1,871,217 | 8/1932 | Klaus | 354/277 |
| 4,034,929 | 7/1977 | Ebner, Jr. | 242/71.1 |
| 4,068,247 | 1/1978 | Bouwen et al. | 354/275 |
| 4,239,164 | 12/1980 | Barnsbee et al. | 242/55.53 |
| 4,272,035 | 6/1981 | Sherman et al. | 242/71.7 X |
| 4,291,802 | 9/1981 | Buelens | 206/409 |
| 4,616,914 | 10/1986 | Buelens et al. | 242/71.1 X |
| 4,730,778 | 3/1988 | Akao et al. | 242/71 X |
| 4,732,271 | 3/1988 | Solyntjes | 242/71.7 X |
| 4,787,513 | 11/1988 | Auble et al. | 242/71.7 X |
| 4,821,876 | 4/1989 | Naito et al. | 206/395 X |
| 4,834,236 | 5/1989 | Buelens et al. | 242/71.1 |

OTHER PUBLICATIONS

*Research Disclosure*, Oct. 1976, pp. 26–27, Article No. 15033, "Web Dispensing cassette", by W. P. Boyd and M. J. Morse.

*Primary Examiner*—William A. Cuchlinski, Jr.
*Assistant Examiner*—Joseph A. Rhoa
*Attorney, Agent, or Firm*—William C. Dixon, III.

[57] ABSTRACT

A light-tight cassette, and method of making same, for enclosing and dispensing a roll of photosensitive web material. The cassette comprises a folded fiberboard housing having a plurality of housing wall portions with oppositely projecting lateral edges which define opposite sides of the housing. The plurality includes two planar wall portions that extend perpendicularly to each other to respective ends thereof which are disposed in spaced alignment to provide an opening between them. Two extruded plastic light-locking members are attached to those wall portion ends, respectively, one such member extending across the opening toward the other member to form a web exit passageway therebetween. The one member includes a resiliently flexible, inwardly projecting cantilever portion that is biased toward an opposing portion of the other member, both such portions having light-locking material thereon. A pair of molded plastic side caps are attached to the opposite sides of the housing, respectively, each cap having an inward-facing hub adapted to support a bearing core on which the roll of web material is freely rotatable to dispense such material through the web exit passageway.

16 Claims, 8 Drawing Sheets

LIGHT-TIGHT CASSETTE

BACKGROUND OF THE INVENTION

2. Field of the Invention

The present invention relates generally to light tight cassettes, and particularly to such cassettes that are intended for housing and dispensing a roll of photosensitive web material.

2. Description of the Prior Art

Light tight cassettes adapted to house and dispense photosensitive web material, such as phototypesetting paper or film, are well known in the Prior art. Examples may be found in the following documents:

U.S. Pat. No. 4,034,929 - Discloses a photosensitive roll dispensing cassette having an exit slot formed by parallel flanges bent inwardly from adjacent cassette walls, and rendered light tight by plush covered, U-shaped, rigid metal strips removably inserted over those flanges.

U.S. Pat. No. 4,068,247 - Discloses a photosensitive roll dispensing cassette having an exit slot formed by integral extensions of adjacent cassette walls that project inwardly therefrom in generally parallel relation to each other, with plush material thereon facing the exit path.

Research Disclosure. October 1976, pages 26–27, Article 15033 - Discloses a photosensitive roll dispensing cassette having an exit slot provided by a pair of faceted tubes formed from integral extensions of adjacent cassette walls folded back upon themselves and bearing resilient light locking material.

While such cassettes may have sufficed for their own particular purposes, there has remained a need for an improved cassette of this type that provides enhanced light lock integrity, exit path consistency, and exit pull force uniformity, and which is simpler and less costly to make.

An overall objective of this invention, therefore, has been to provide a light tight cassette that meets the foregoing need so as to be more efficient in both manufacture and use.

SUMMARY OF THE INVENTION

The present invention finds utility in an improved light tight cassette for enclosing and dispensing a roll of web material. Such a cassette as improved by this invention comprises a housing including a plurality of housing wall portions having oppositely projecting side edges, the housing wall portions including first and second substantially planar wall portions that extend continuously in respective first and second perpendicular planes to respective first and second wall portion ends which are disposed in spaced alignment with each other in the second plane to define an opening in the second plane between those ends. The impressed cassette further comprises first and second separately formed light locking members attached to the first and second wall portion ends, respectively, one of those members extending across said opening in the second plane toward the other of those members to define a web exit passageway between the two members, the one member including a cantilever portion that is resiliently flexible toward and away from an opposing portion of the other member, both of the cantilever and opposing portions projecting inwardly from and substantially perpendicularly to the second plane, at least one of the cantilever and opposing portions having light locking material Thereon, each of the light-locking members includes a resiliently flexible U-shaped portion defining an open-ended channel configured to slidably receive and resiliently grip one of the wall portion ends, to thereby attach the first and second light-locking members to the first and second wall portion ends respectively. The one of those members extending across said opening in the second plane is the first light-locking member attached, via its U-shaped portion projecting substantially in the first plane, to the first wall portion end. The first member includes a substantially planar intermediate portion that extends perpendicularly from its U-shaped portion, substantially in the second plane, to its cantilever portion, which is flexibly joined to the intermediate portion to project inwardly therefrom in a resiliently flexible manner. The cassette further comprises a pair of side caps having means for receiving, respectively, the oppositely projecting side edges of the plurality of housing wall portions and means for positioning the roll for relative rotation inside the housing.

This invention, and its objects and advantages, will become more apparent in the detailed description of the preferred and alternative embodiments thereof presented hereinbelow.

BRIEF DESCRIPTION OF THE DRAWINGS

In the detailed description of the embodiments of this invention presented below, reference is made to the accompanying drawings, wherein like reference characters denote like elements, and wherein.

DESCRIPTION OF THE ILLUSTRATED EMBODIMENTS

Because certain parts of light tight cassettes are well known, the following description is directed in particular to those elements forming, cooperating directly with, or relating to, this invention. Elements not specifically shown or described herein are selectable from those known in the relevant art.

Figure 1:
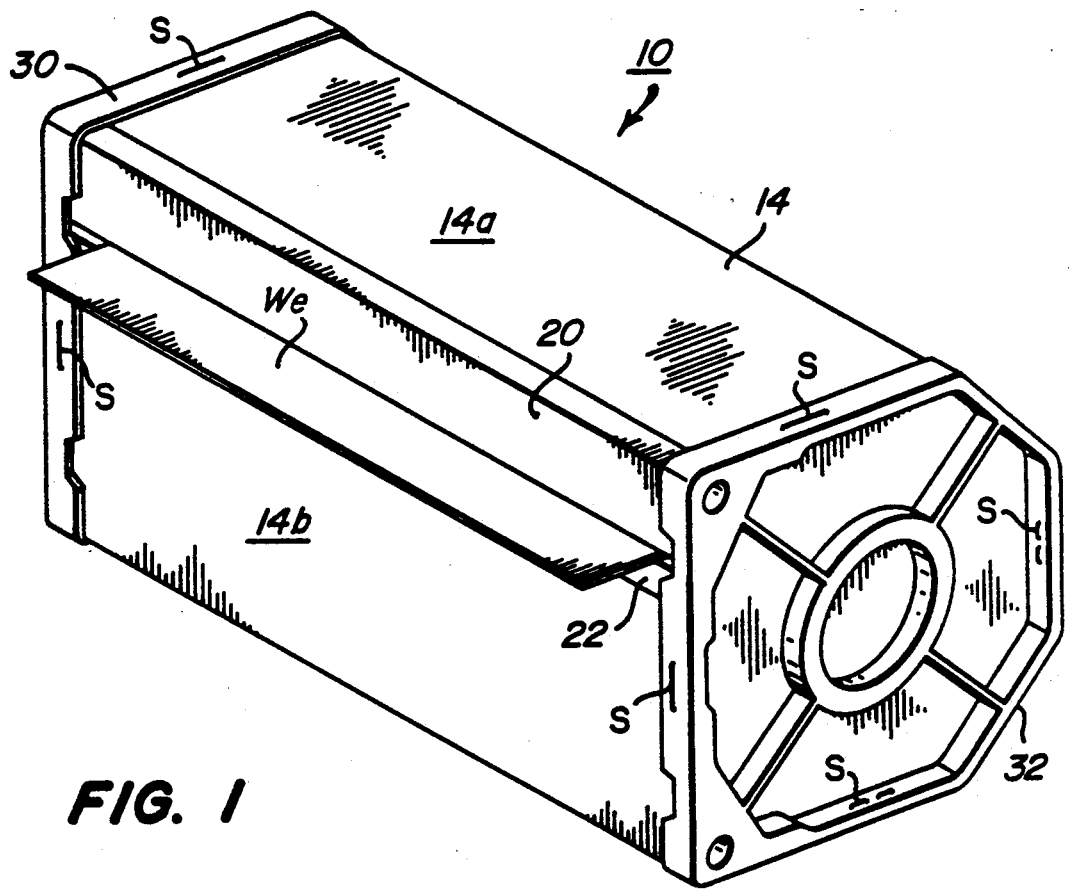
FIG. 1 is a perspective view of a light tight cassette as improved in accordance with the preferred embodiment of this invention, showing the improved cassette in its fully assembled and closed condition.
Figure 2:
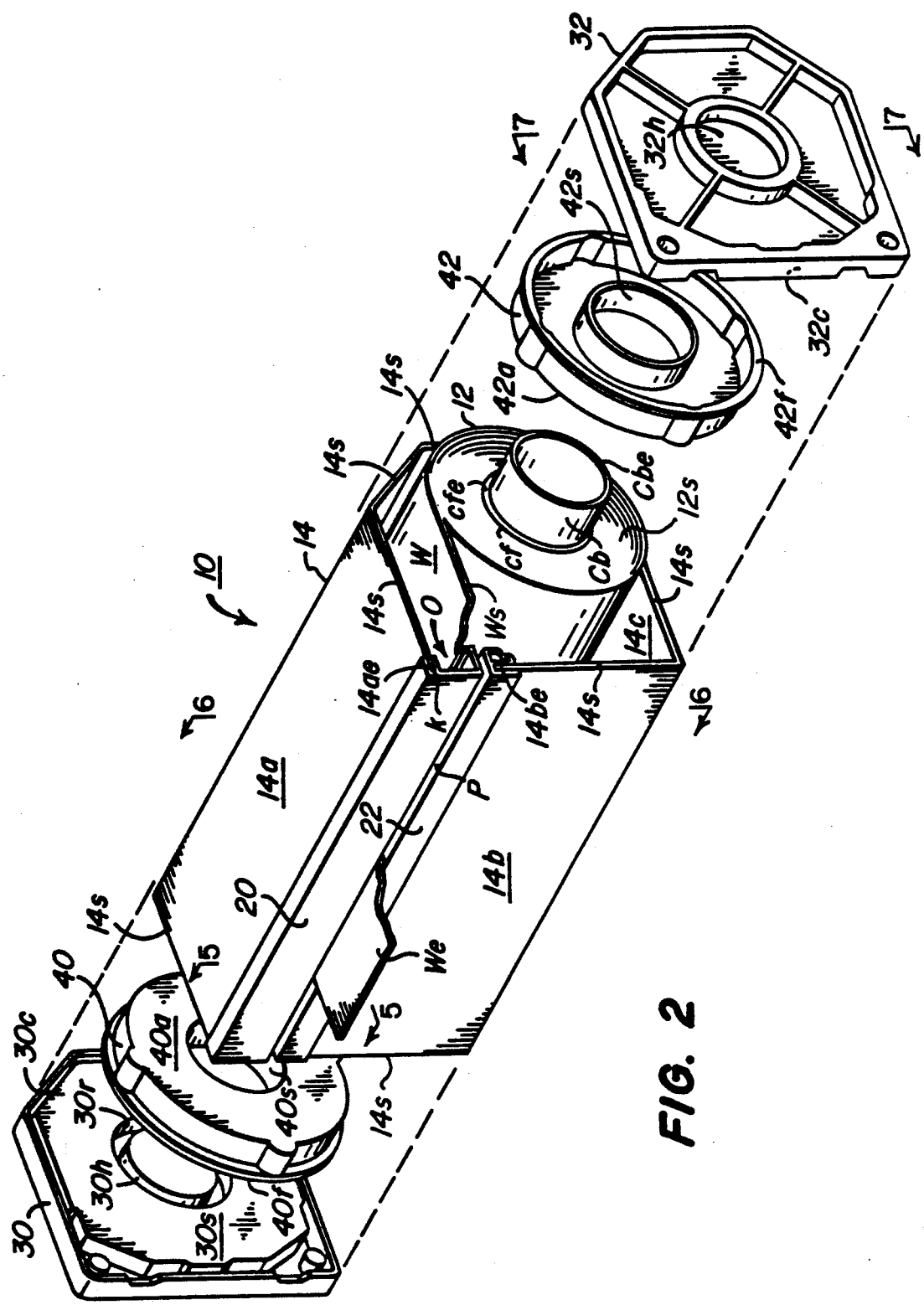
FIG. 2 is an exploded perspective view of the cassette shown in FIG. 1, with its side caps separated from the cassette housing and the web roll therein partially withdrawn.
Figure 8:
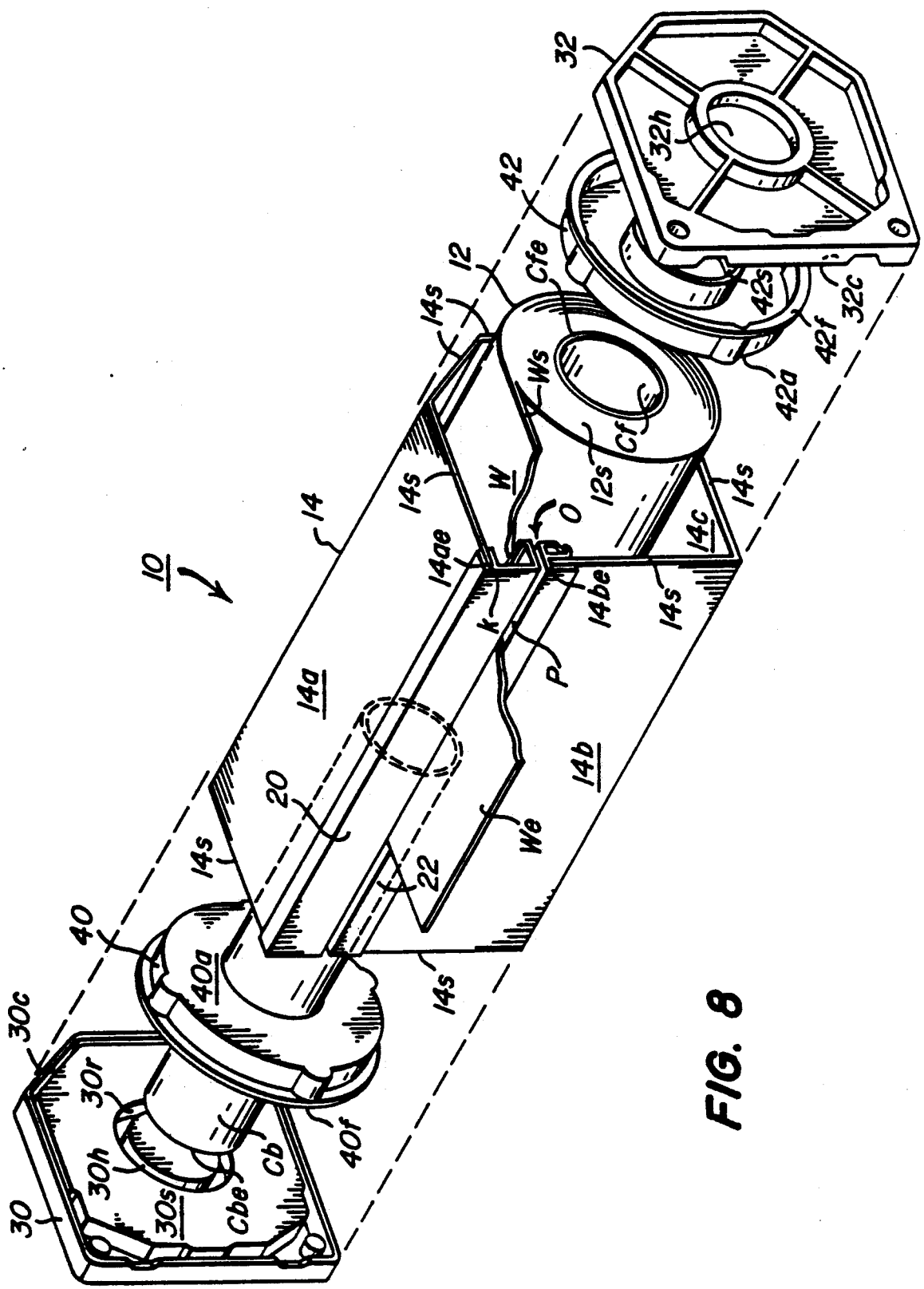
FIG. 8 is an exploded perspective view similar to FIG. 2, above, showing means provided in the cassette to position and support the Web roll for rotation relative to the side caps, spacing members, and housing.

FIGS. 1, 2, and 8 illustrate, in perspective, a light tight cassette 10 for enclosing and dispensing a roll 12 of photosensitive web material W. The cassette comprises a housing 14 which, as shown most clearly in FIG. 4, includes a plurality of housing wall portions 14a, 14b, 14c, 14d, 14e, and 14f having oppositely projecting side edges 14s. Housing wall portions 14a and 14b are substantially planar and extend perpendicularly to each other, and terminate in respective wall portion ends 14ae and 14be. It will be noted that ends 14ae and 14be are spaced from each other to define an opening O therebetween. It also will be noted that wall portions 14a and 14b lie in respective perpendicular planes that intersect at a locus which defines a corner K of the cassette. As shown, the wall portion ends 14ae and 14be, and the opening O therebetween, lie substantially in the plane of wall portion 14b.

Figure 3:
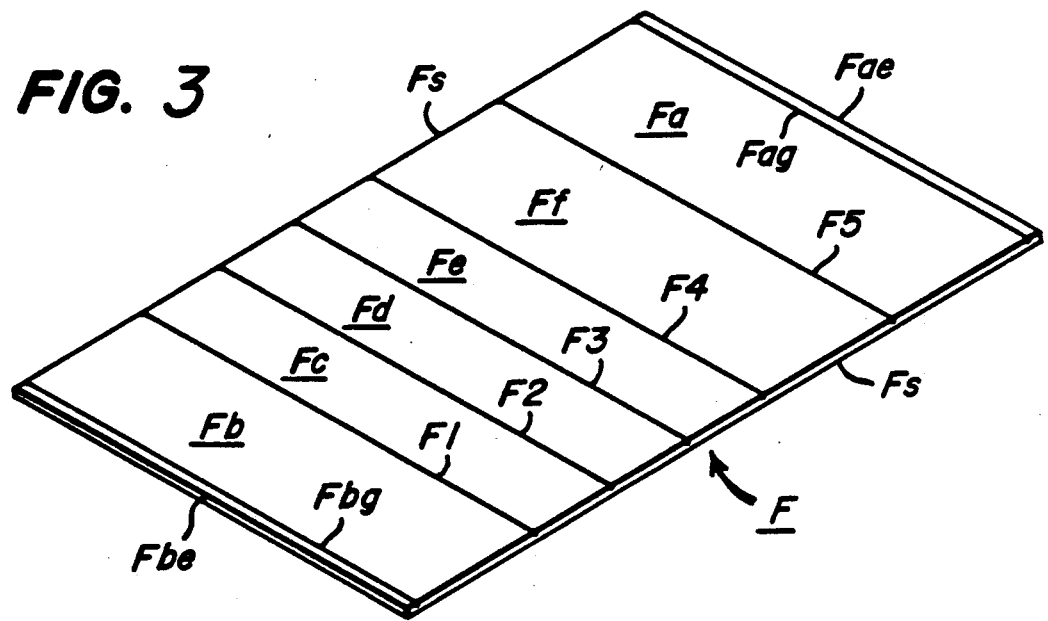
FIG. 3 is a perspective view of a flat fiberboard sheet that has been precut and creased to form, when folded, a cassette housing.
Figure 4:
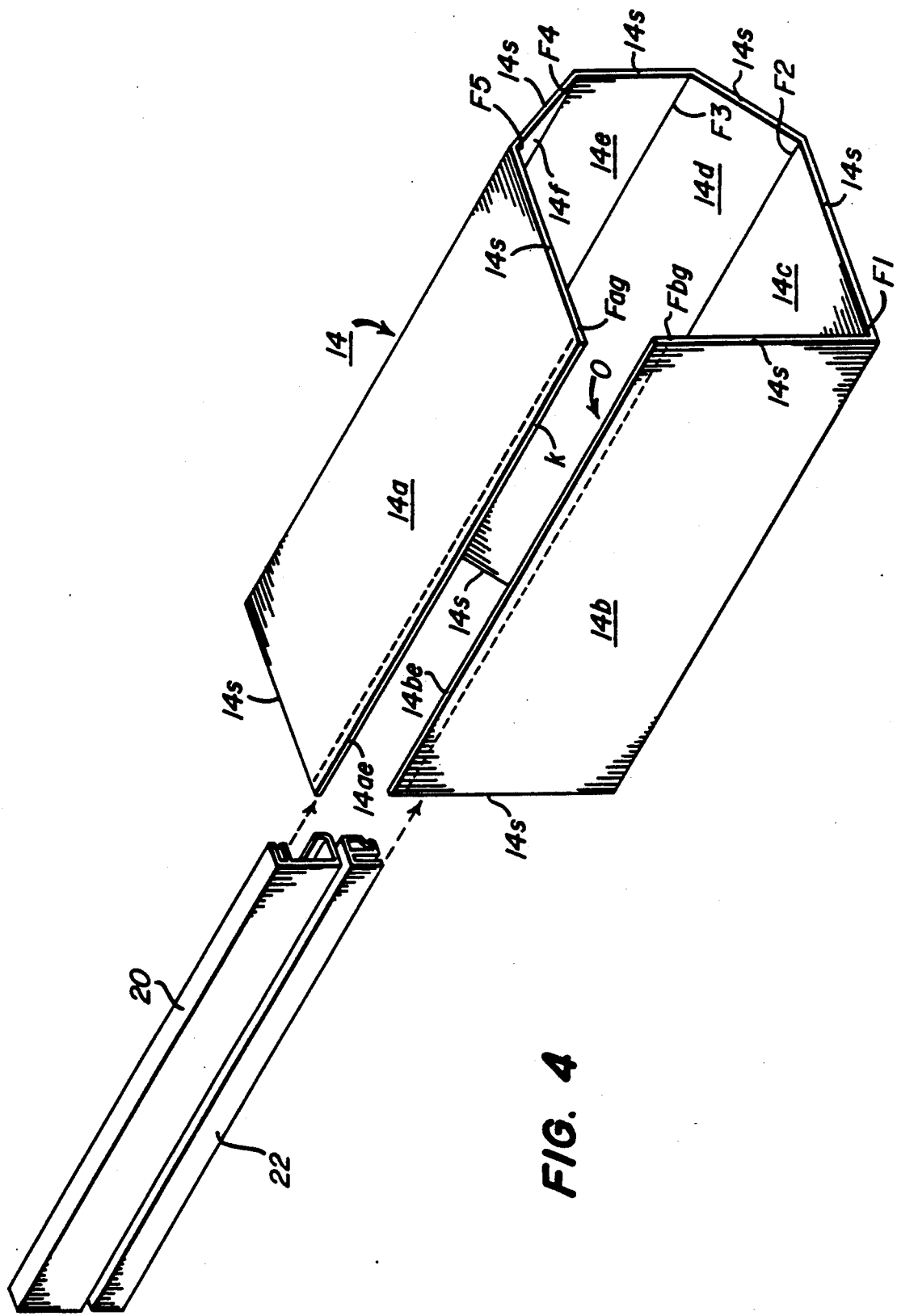
FIG. 4 is a perspective view of the fiberboard sheet of FIG. 3 after it has been folded and erected to form a cassette housing, showing light locking members about to be positioned on the housing.

Housing 14 is made from a flat sheet F of fiberboard, shown in FIG. 3, which has been precut to specified dimensions and creased to provide fold lines F1, F2, F3, F4, and F5, along which sheet F is folded and erected to form housing 14 as shown in FIG. 4. It will be noted that areas of sheet F designated Fa, Fb, Fc Fd, Fe, and Ff correspond respectively to housing wall portions 14a, 14b, 14c, 14d, 14e, and 14f. Also, the sheet F lateral edges Fs correspond respectively to housing wall portion side edges 14s, while the sheet F longitudinal ends Fae and Fbe correspond respectively to housing wall portion ends 14ae and 14be.

Attached to ends 14ae and 14be, respectively, are a pair of light locking members 20 and 22, depicted in FIG. 4 as they are about to be positioned thereon. When members 20 an 22 are fully positioned on ends 14ae and 14be as shown in FIGS. 2 and 8, member 20 extends across opening O toward member 22, to define a web exit passageway P therebetween. As illustrated more clearly in FIG. 5, member 20 includes an inwardly projecting cantilever portion 20c that is resiliently flexible toward and away from an opposing portion 22o of member 22. Preferably, both portions 20c and 22o have strips of light locking material m and n adhered thereto, respectively, to light lock the exit passageway P.

Figure 5:
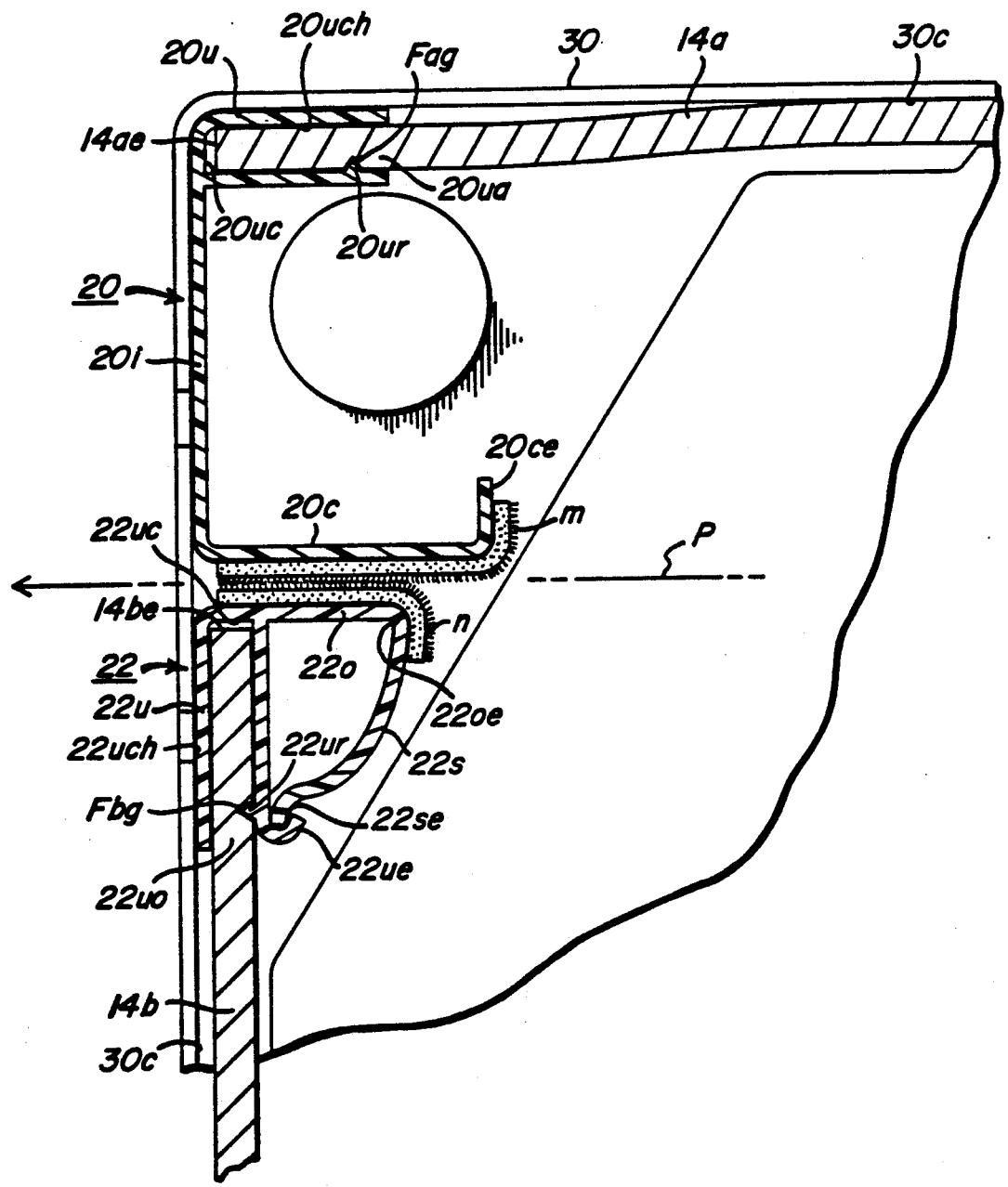
FIG. 5 is an enlarged sectional view of a corner portion of the cassette, taken along line 5—5 in FIG. 2, showing details of the light locking members as fully positioned on the housing.
Figure 6:
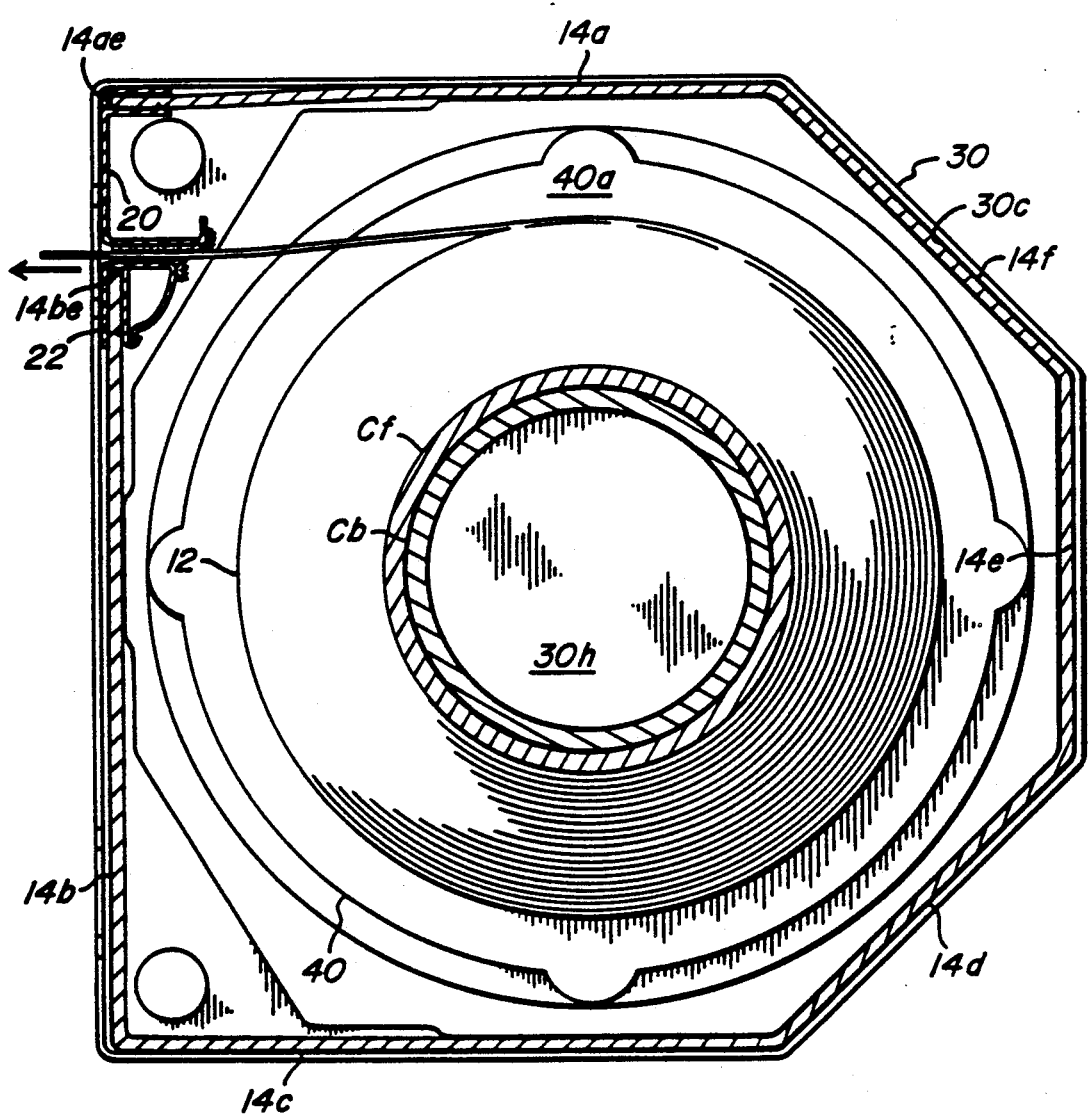
FIG. 6 is an enlarged transverse sectional view of the cassette, taken along line 6—6 in FIG. 2, showing positional relationships of one side cap, mating housing walls, the two light locking members, one spacing member, a bearing core, and the web roll.

Light locking member 20 includes a resiliently flexible U shaped portion 20u having open and closed ends 20uo and 20uc, respectively, which define a channel 20uch configured to slidably receive and resiliently grip wall portion end 14ae, to thereby attach member 20 to that end. Similarly, light locking member 22 includes a resiliently flexible U-shaped portion 22u having open and closed ends 22uo and 22uc, respectively, which define a channel 22uch for slidably receiving and resiliently gripping wall portion end 14be. The two U-shaped portions 20u and 22u have longitudinally extending ribs 20ur and 22ur that protrude respectively into channels 20uch and 22uch to help grip the wall portion ends 14ae and 14be received therein. As shown in FIGS. 3, 4, and 5, the Fiberboard sheet F is creased to provide rib receiving grooves Fag and Fbg to receive ribs 20ur and 22ur on the light locking member U-shaped portions, to thereby help grip the wall portion ends received in channels 20uch and 22uch respectively.

Light locking member 20 further includes a substantially planar intermediate portion 20i that extends perpendicularly from closed end 20uc of U-shaped portion 20u to the cantilever portion 20c, which is flexibly joined to intermediate portion 20i to project inwardly therefrom in a resiliently flexible manner. The opposing portion 22o of light locking member 22 extends inwardly, and substantially perpendicularly, from closed end 22uc of U-shaped portion 22u to oppose the cantilever portion 20c of member 20. Cantilever portion 20c extends inwardly beyond opposing portion 22o to a free end 20ce that is distal from intermediate portion 20i, to help guide the web material W from roll 12 into the exit passageway. The cantilever portion 20c is resiliently biased toward opposing portion 22o so as to maintain the strips of light locking material m and n in contact with web material W.

Light locking member 22 further includes a supporting portion 22s which interconnects opposing portion 22o and U-shaped portion 22u. Supporting portion 22s is flexibly joined to opposing portion 22o at a location 22oe on the opposing portion that is inwardly distant from closed end 22uc of U-shaped portion 22u; supporting portion 22s then projects angularly, and somewhat arcuately, therefrom into retaining engagement with U-shaped portion 22u at a location thereon which is perpendicularly distant from opposing portion 22o. Supporting portion 22s includes an end lip 22se distal from location 22oe; and U-shaped portion 22u has a retaining lip 22ue adjacent to the open end 22uo of U-shaped portion 22u. As shown in FIG. 5, end lip 22se is engaged with retaining lip 22ue to effect said retaining engagement and thereby provide necessary support for opposing portion 22o.

Figure 9:
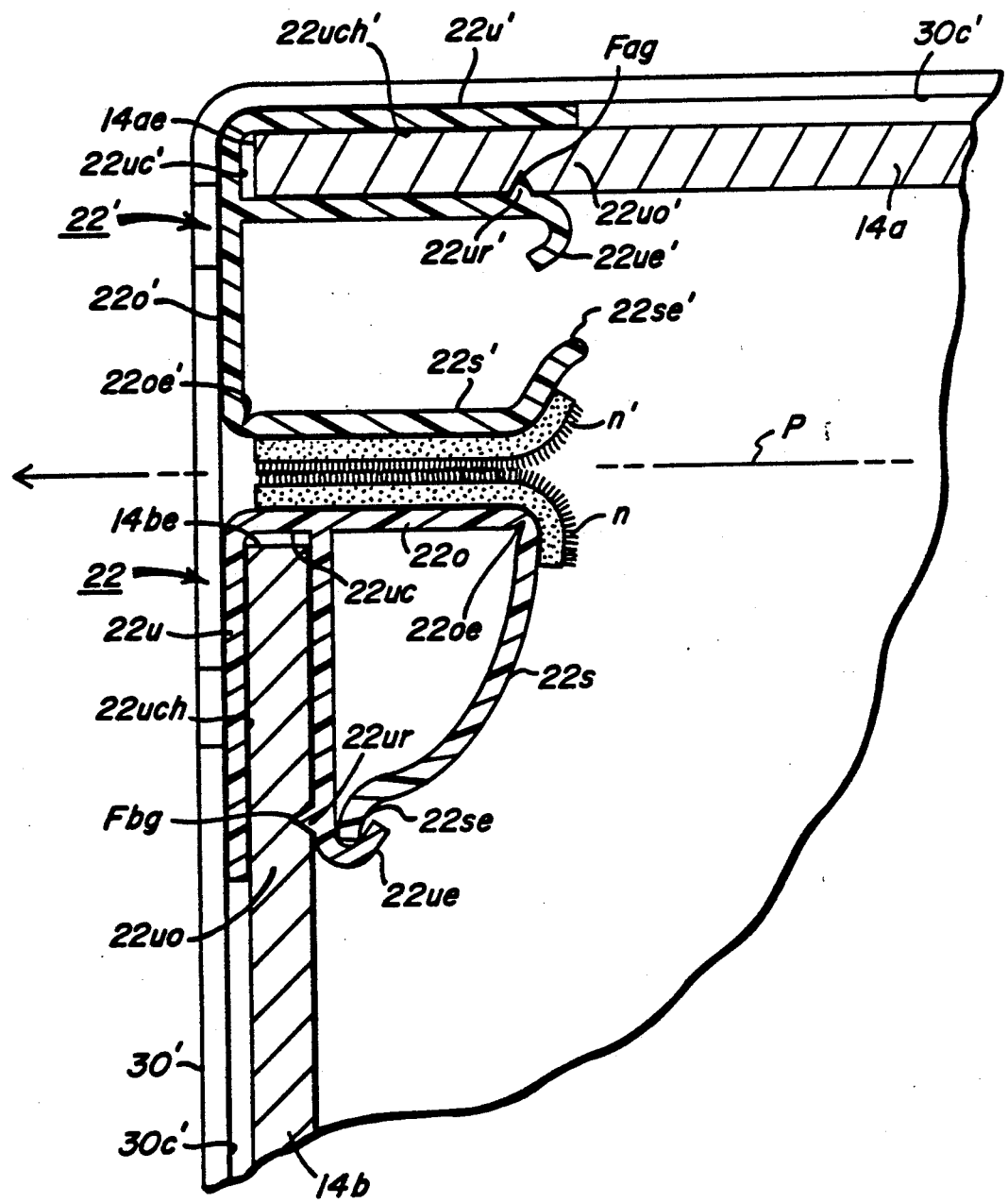
FIG. 9 is an enlarged sectional view similar to FIG. 5, above, but showing light locking members as configured and positioned in accordance with an alternative embodiment of this invention.

An alternative embodiment of this invention is illustrated in FIG. 9, which presents a view similar to that seen in FIG. 5. It will be noted that the lower light locking member 22 in FIG. 9 is configured and positioned on wall portion end 14be precisely as shown in FIG. 5. In the FIG. 9 embodiment, however, the upper light locking member 20 of FIG. 5 is replaced by a different light locking member 22'. With two exceptions, upper member 22' in FIG. 9 is identical to lower member 22. The first exception is that portion 22s' of member 22' projects substantially perpendicularly from intermediate portion 22o' so that its free end 22se' is not engaged with, but is spaced from, lip 22ue' on U-shaped portion 22u'. Portion 22s' is thus free to perform the same function that cantilever portion 20c in FIG. 5 performs. The second exception is that the light locking material strip n' on upper member 22' is adhered to the underside of portion 22s' so as to face its counterpart n on lower member 22. Because of its flexible connection to intermediate portion 22o' at location 22oe', portion 22s' is resiliently flexible toward and away from opposing portion 22o, as is cantilever portion 20c in FIG. 5. In all other respects, as mentioned above, upper member 22' is identical to lower member 22. Thus, its U-shaped portion 22u' has open and closed ends 22uo' and 22uc', respectively, which define a channel 22uch' for slidably receiving and resiliently gripping wall portion end 14ae, and U-shaped portion 22u' also has a longitudinally extending rib 22ur' that protrudes into channel 22uch' to assist in gripping wall portion end 14ae when received therein. An advantage of this embodiment over the FIG. 5 embodiment is that, as seen in FIG. 9, the same design of light locking member is used for attachment to both wall portion ends.

Preferably, the light locking members of both embodiments are made of extruded thermoplastic resin, polypropylene being especially suitable. A preferred construction for the light locking material strips m, n, and n' is polyurethane foam with a nylon overlay and an adhesive underlay, for adhereing the strips to the light locking members. The combination of polyurethane foam and nylon overlay has proven beneficial in light locking the exit passageway without marring sensitive surfaces of the exiting web.

Referring now to FIGS. 1, 2, and 8, the cassette of this invention further comprises a pair of side caps 30 and 32 having means for receiving, respectively, the oppositely projecting side edges 14s of the housing wall portions and means adapted to facilitate positioning of web roll 12 for relative rotation inside housing 14. The side cap means for receiving oppositely projecting side edges 14s include respective perimetric channels 30c and 32c configured to slidably receive those edges therein. (To distinguish the alternative embodiment depicted in FIG. 9, side cap and its perimetric channel 30c are designated therein by the reference characters 30' and 30c' respectively.) The side cap means to facilitate positioning of the web roll for relative rotation inside the housing include centrally disposed, inwardly extending, hubs 30h and 32h on side caps 30 and 32 respectively. The web roll 12 is wound upon a roll Forming core Cf having opposite ends Cfe that are substantially flush with respective opposite sides 12s of the roll. Rotatably supporting roll forming core Cf is a roll bearing core Cb having opposite end portions Cbe extending laterally beyond respective opposite ends Cfe and sides 12s. The two end portions Cbe are configured and dimensioned so as to be supportively receivable by the side cap hubs 30h and 32h respectively. Single roll forming core Cf is dimensioned to rotate freely upon roll bearing core Cb, there is no need for the roll bearing core to rotate relative to the hubs. Preferably, side caps 30 and 32 are made of molded thermoplastic resin, polystyrene being specially suitable. The web W illustrated in the drawings is phototypesetting paper, although the web could be any photosensitive paper or film material. The two cores Cf and Cb are each made of a suitable fiberboard material, both the inner surface of core Cf and the outer surface of core Cb being sufficiently hard and smooth to resist undue wearing during use.

Figure 7:
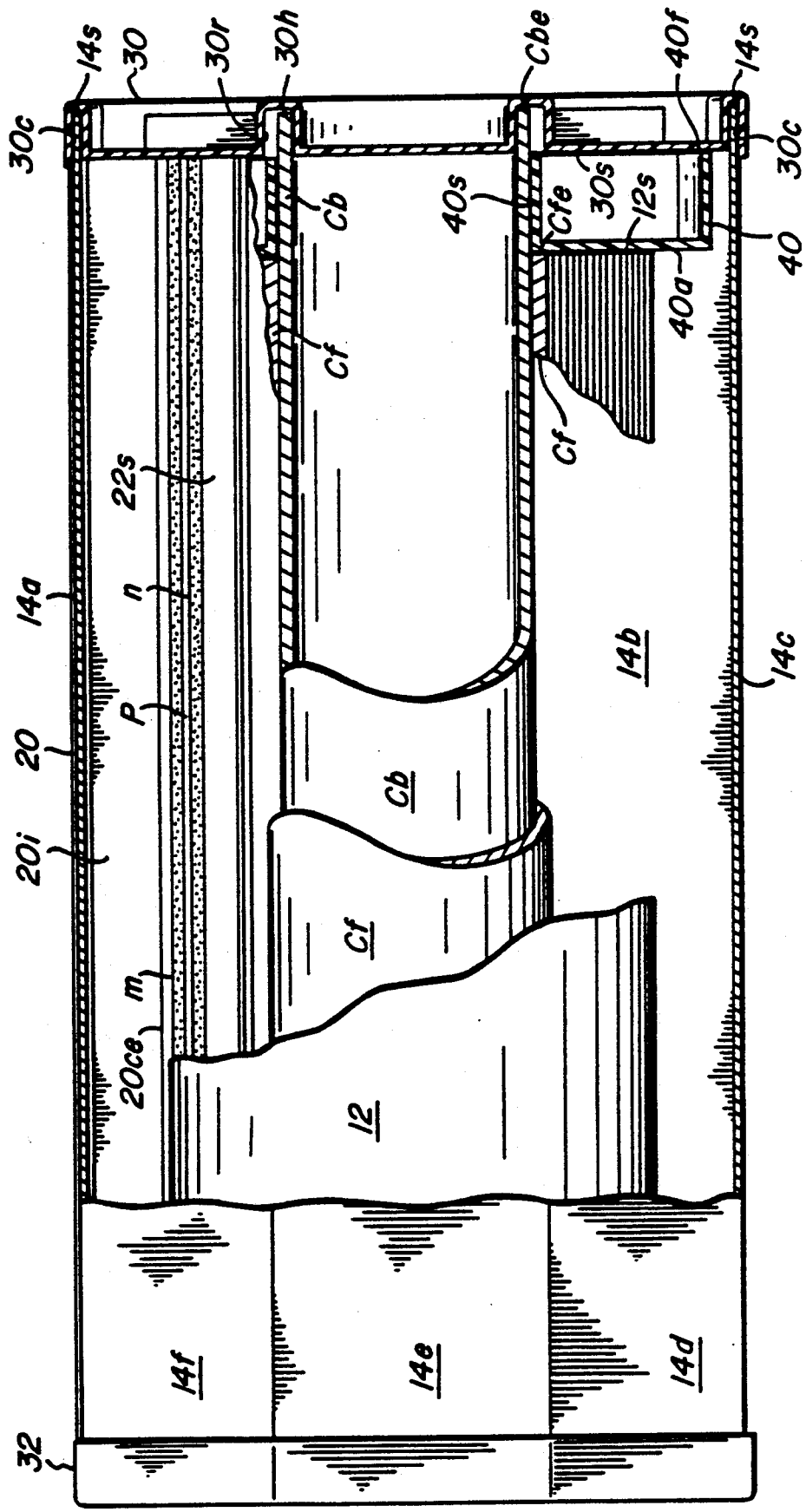
FIG. 7 is an enlarged longitudinal, partially sectional, view of the cassette, taken generally along line 7—7 in FIG. 2, showing positional relationships of the light locking members, supporting housing walls, both side caps, one spacing member, the bearing core, and the web roll.

To help locate roll 12 medially within the cassette housing, a pair of annular spacers 40 and 42 are disposed respectively around the two opposite end portions Cbe of the roll bearing core, each between one of the caps 30 and 32 and the facing one of roll sides 12s as shown in FIGS. 2, 7, and 8. When the cassette is fully assembled, an annular outward facing flange surface 40f on spacer 40 is disposed in adjacent facing relation to an inward facing surface 30s on side cap 30, while an annular inward-facing surface 40a on spacer 40 is in similar facing relation to the adjacent side 12s of the web roll. With spacer 40 so positioned, the corresponding end portion of roll bearing core Cb extends freely through a sleeve portion 40s of spacer 40, into an annular recess 30r surrounding hub 30h on cap 30, and thus onto the hub itself. Similarly, spacer 42 is disposed so that its annular outward-facing flange surface 42f is in adjacent facing relation to an inward facing surface (not shown) on side cap 32, while its annular inward-facing surface 42a is in similar facing relation to the adjacent side 12s oF the web roll. Here too, the corresponding end portion of roll bearing core Cb extends freely through a sleeve portion 42s of spacer 42, into an annular recess (not shown) surrounding hub 32h on cap 32, and thus onto that hub. Preferably, spacers 40 and 42 are thermoformed from a suitable thermoplastic resin such as polystyrene.

The preferred method of making a cassette in accordance with this invention will now be described.

First, the fiberboard sheet F is cut to predetermined dimensions and creased to provide the fold lines and rib receiving grooves discussed above. Sheet F is then folded along its fold lines and erected to form housing 14 as shown in FIG. 4.

The light locking members preferably are extruded from a thermoplastic resin, such as polypropylene, and cut to their specified length. The aforementioned strips of light locking material, cut to the same length, are then applied to the light locking members Before the lower light locking member 22 is attached to housing wall portion end 14be, its supporting portion end lip 22se is snapped into engagement with retaining lip 22ue to provide needed support for opposing portion 22o. The two light locking members are then attached to their respective housing wall portion ends as described above and illustrated in FIG. 4.

The roll 12 is provided with its web material W wound upon hollow roll forming core Cf, whose opposite ends Cfe are substantially flush with the web material lateral edges Ws forming roll sides 12s, thereby defining an overall roll width. The roll bearing core Cb is provided so as to fit slidably within core Cf, and so that its oppositely projecting end portions Cbe define a bearing core length which is greater than the overall roll width.

The side caps 30 and 32 preferably are molded from a thermoplastic resin such as polystyrene. With parts oriented as shown in FIGS. 1, 2, 4, and 8, side cap 30 is first attached to the open housing side defined by leftward projecting wall edges 14s, by slidably inserting those edges into perimetric channel 30c. Roll bearing core Cb is then inserted through the open housing side defined by rightward projecting wall edges 14s (hereinafter the "right housing side") and fully into housing 14 so that the bearing core left end portion Cbe is received within annular recess 30r and around hub 30h. The web roll 12 is then inserted through the still open right housing side, around bearing core right end portion Cbe, and thence slidably along the bearing core and into housing 14 until its left side 12s abuts against side cap surface 30s, so that both bearing core end portions Cbe extend laterally beyond the two roll forming core ends Cfe, and so that an end portion We of the web material leading from roll 12 projects outwardly through passageway P as illustrated. Side cap 32 is then attached to the open right housing side, by sliding the bearing core right end portion Cbe onto hub 32h and the rightward projecting wall edges 14s into perimetric channel 32c, thereby closing the housing. Finally, the two side caps 30 and 32 are firmly secured to their respective housing sides by appropriately positioned staples S as shown in FIG. 1.

In the event that spacing members such as spacers 40 and 42 are needed to locate web roll 12 medially within the cassette, such spacers, preferably thermoformed from a thermoplastic resin such as polystyrene, are positioned inside the cassette housing as follows (with parts oriented as shown in FIGS. 2 and 8): (1) before inserting web roll 12, spacer 40 is inserted through the open right housing side, around and along the bearing core Cb, fully into the housing, and against side cap surface 30s; (2) web roll 12 is then inserted into the housing as described above but only to the extent that its left side 12s abuts against spacer surface 40a (instead of side cap surface 30s); and (3) after inserting web roll 12, spacer 42 is inserted through the still open right housing side around and partway along the bearing core Cb, into the housing, and against the right roll side 12s. When the cassette is fully assembled with spacers 40 and 42 so positioned, the web roll is thus located medially within the cassette housing, in laterally spaced relation to both side caps.

The present invention has now been described in detail with particular reference to embodiments illustrated herein It will be understood, however, that variations and modifications can be effected within the spirit and scope of this invention.

We claim:

1. A light-tight cassette for enclosing and dispensing a roll of web material, said cassette comprising:

a housing including a plurality of housing wall portion shaving oppositely projecting side edges, said plurality including first and second substantially planar wall portions that extend continuously in respective first and second perpendicular planes to respective first and second wall portion ends that are disposed in spaced alignment with each other in said second plane to define an opening in said second plane between said wall portion ends;

first and second separately formed light-locking members attached to said first and second wall portion ends, respectively, one of said members extending across said opening in said second plane toward the other of said members to define a web exit passageway between said members, said one member including a cantilever portion that is resiliently flexible toward and away from an opposing portion of said other member, both of said cantilever portion and said opposing portion projecting inwardly from and substantially perpendicularly to said second plane, at least one of said cantilever portion and said opposing portion having light-locking material thereon, each of said light-locking members including a resiliently flexible U-shaped portion defining an open-ended channel configured to slidably receive and resiliently grip one of said wall portion ends, to thereby attach said first and second light-locking members to said first and second wall portion ends respectively, said one of said members extending across said opening in said second plane being said first light-locking member attached, via said U-shaped portion of said first member projecting substantially in said first plane, to said first wall portion end, said first member including a substantially planar intermediate portion that extends perpendicularly from said U-shaped portion of said first member, substantially in said second plane, to said cantilever portion of said first member, said cantilever portion being flexibly joined to said intermediate portion to project inwardly therefrom in a resiliently flexible manner; and a pair of side caps having means for receiving, respectively, said oppositely projecting side edges of said plurality of housing wall portions and means for positioning said roll for relative rotation inside said housing 2. A light-tight cassette as claimed in claim 1 wherein said other of said members is said second light-locking member attached, via said U-shaped portion of said second member projecting substantially in said second plane, to said second wall portion end; wherein said opposing portion of said second member extends inwardly and substantially perpendicularly from said U-shaped portion of said second member to oppose said cantilever portion of said first member; and wherein said second member further includes a supporting portion angularly interconnecting said opposing portion and said U-shaped portion of said second member.

3. A light-tight cassette as claimed in claim 2 wherein said supporting portion of said second member is flexibly joined to said opposing portion of said second member at a location on said opposing portion inwardly distant from said U-shaped portion of said second member, and projects angularly from said location into retaining engagement with said U-shaped portion of said second member at a site thereon that is distant from said opposing portion.

4. A light-tight cassette as claimed in claim 3 wherein said supporting portion of said second member includes an end lip distal from said location; wherein said U-shaped portion of said second member includes a retaining lip at said site thereon; and wherein said end lip is engaged with said retaining lip to provide said retaining engagement.

5. A light-tight cassette as claimed in claim 4 wherein each of said U-shaped portions of said first and second light-locking members includes a rib protruding into said open-ended channel thereof to help grip the one of said first and second wall portion ends received therein.

6. A light-tight cassette as claimed in claim 5 wherein said at least one of said cantilever portion and said opposing portion having light-locking material thereon includes said cantilever portion; and wherein said cantilever portion is resiliently biased toward said opposing portion so as to maintain said light locking material thereon in contact with web material from said roll thereof that is in said exit passageway.

7. A light tight cassette as claimed in claim 6 wherein each of said light locking members is made of extruded thermoplastic resin.

8. A light tight cassette as claimed in claim 7 wherein said extruded thermoplastic resin includes polypropylene.

9. A light tight cassette as claimed in claim 7 wherein each of said side caps is made of molded thermoplastic resin.

10. A light tight cassette as claimed in claim 9 wherein said molded thermoplastic resin includes polystyrene.

11. A light tight cassette as claimed in claim 7 wherein said housing is made from a sheet of fiberboard folded to form said plurality of housing wall portions.

12. A light tight cassette as claimed in claim 11 wherein said cantilever portion of said first member extends inwardly beyond said opposing portion of said second member to a free end of said cantilever portion distal from said intermediate portion, to help guide web material from said roll thereof into said exit passageway.

13. A light-tight cassette as claimed in claim 12 including said roll of web material supported by a roll bearing core having opposite end portions extending laterally beyond respective opposite sides of said roll; and wherein said means on said side caps of positioning of said roll includes means for receiving, respectively, said opposite end portions of said roll bearing core.

14. A light tight cassette as claimed in claim 13 wherein said roll of web material is wound upon a roll forming core having opposite ends substantially flush with respective opposite sides of said roll; and wherein said roll forming core is rotatably supported by said roll bearing core, for rotation of said roll and roll forming core relative to said roll bearing core.

15. A light tight cassette as claimed in claim 13 wherein said means for receiving, respectively, said opposite end portions of said roll bearing core includes, on each of said side caps, a centrally disposed hub configured to supportively receive a respective one of said end portions.

16. A light tight cassette as claimed in claim 13 including a pair of spacers disposed respectively around said opposite end portions of said roll bearing core, between said side caps and respective opposite sides of said roll, to locate said roll medially within said housing.

* * * * *